United States Patent
Castelow et al.

(10) Patent No.: US 7,562,513 B2
(45) Date of Patent: Jul. 21, 2009

(54) HARNESS FOR AN ANIMAL

(75) Inventors: Richard Castelow, Versailles, KY (US); Roslyn Marie Abel, Wellington, FL (US)

(73) Assignee: Saddler's Bench, LLC, Wellington, FL (US)

( * ) Notice: Subject to any disclaimer, the term of this patent is extended or adjusted under 35 U.S.C. 154(b) by 0 days.

(21) Appl. No.: 11/619,727

(22) Filed: Jan. 4, 2007

(65) Prior Publication Data

US 2008/0163593 A1  Jul. 10, 2008

(51) Int. Cl.
B68B 1/02 (2006.01)
B68B 1/04 (2006.01)
(52) U.S. Cl. .................................. 54/6.1; 54/24; 54/13
(58) Field of Classification Search .............. 54/24, 54/13, 12, 6.1, 6.2
See application file for complete search history.

(56) References Cited

U.S. PATENT DOCUMENTS

| 4,459,795 | A | * | 7/1984 | Le Tixerant | 54/6.2 |
| 4,472,925 | A | * | 9/1984 | Woodruff | 54/24 |
| 4,589,248 | A | | 5/1986 | Ruddock et al. | |
| 5,660,031 | A | * | 8/1997 | Clark | 54/71 |
| 6,591,589 | B2 | | 7/2003 | Cook | |
| 6,662,536 | B2 | * | 12/2003 | Belton et al. | 54/7 |
| 2002/0148207 | A1 | * | 10/2002 | Cook | 54/6.1 |
| 2007/0033908 | A1 | * | 2/2007 | Menet | 54/13 |

FOREIGN PATENT DOCUMENTS

| DE | 20313295 U1 | * | 10/2003 |
| DE | 2006002668 U1 | * | 8/2006 |
| DE | 2006002710 U1 | * | 8/2006 |
| EP | 434152 A1 | * | 6/1991 |
| FR | 2893017 A1 | * | 5/2007 |
| GB | 2110515 A | * | 6/1983 |

* cited by examiner

Primary Examiner—Son T. Nguyen
(74) Attorney, Agent, or Firm—King & Schickli, PLLC

(57) ABSTRACT

A headpiece is provided for use in a harness for controlling movement of an animal. The headpiece includes at least one strap for placing over an animal's poll and a spacer for reducing pressure caused by impinging of the strap on the poll of the animal on which the headpiece is placed. The spacer provides a separation between the strap and at least a portion of the poll of the animal on which the headpiece is placed, and includes at least one cushioning segment on the strap defining a gap for providing the separation. A harness for controlling movement of an animal is also provided, incorporating the headpiece as described. Still further, a method for making a harness for controlling the movement of an animal is described. The harness may be configured as a bridle, a halter, a hackamore, and the like.

18 Claims, 4 Drawing Sheets

HARNESS FOR AN ANIMAL

TECHNICAL FIELD

The present invention relates to harnesses for use in controlling movement of an animal. In particular, the invention relates to a harness such as a bridle, having a headpiece adapted to reduce pressure on the poll of an animal on which the harness is placed.

BACKGROUND OF THE INVENTION

It is well known to provide particular harnesses for controlling movement of an animal's head. Essentially, such harnesses constitute headgear for guiding movement of an animal by providing control of the animal's head. Examples of such harnesses include the halter, the hackamore, and in equitation or driving sports, the bridle.

With reference to FIG. 1, it is specifically known in the art to provide a harness 10 for controlling movement of an animal, in the depicted example a horse. Such a harness 10 typically includes at least a headpiece 12 (also called a crownpiece or crown) which passes behind the animal's ears and over the animal's poll P (the top or back of the animal's head), a noseband 14 which encircles the animal's nose, and opposed cheekpieces 16, 18 connecting the headpiece 12 and noseband 14. The cheekpieces 16, 18 may simply be extensions of the headpiece 12, depending on the particular manufacture of the harness 10. These components function primarily to retain the harness 10 on the head of the animal, without slippage.

Of course, such harnesses may include additional elements, in accordance with the type of harness under consideration. For example, a bridle as is shown in FIG. 1 will typically also include a browband 20 which passes over the animal's forehead and attaches to or extends from the headpiece 12, and a throatlatch 22 (also called a throatlash) which passes under the animal's windpipe area and also typically attaches to or extends from the headpiece 12. Additional elements may include a bit (not shown for convenience) which may be one of a number of known designs, and reins (not shown for convenience) to provide means for controlling the animal's movement. Each element of the harness 10 cooperates to provide a desired level of control of the animal's head by a rider or driver, either by preventing slippage or dislodging of the harness 10 from the animal's head or by applying pressure to various sensitive areas of the animal's head such as the tongue, lips, bars (fleshy spaces in the lower jaw), chin groove, and the like.

In, for example, equine sports, the primary pressure points used to control the horse are on or in the horse's mouth, nose, and chin. To achieve a successful collaboration between the animal wearing a harness as described above and the animal's handler, a harness must be capable of applying an effective amount of pressure to such pressure points, to achieve the desired reaction from the animal. A well-trained, intelligent animal such as a sport horse will eventually understand what is expected of it based on minimal input from the handler or rider, and accordingly over time less pressure will be required at the pressure points to achieve the desired goal. Indeed, many well-trained or highly sensitive animals will react adversely to overly harsh application of pressure, or to excessive pressure at the various known pressure points.

The primary function of the headpiece of a harness, as described above, is to prevent the harness from slipping forward down the animal's face and off of the animal's nose. For that reason, in use the headpiece passes over the animal's poll, thereby preventing such slippage. However, the animal's poll, or the fleshy area on the top of the head immediately behind the ears, is also quite sensitive, and application of undue or unneeded pressure thereto may provoke an adverse reaction from the animal as discussed above. There is accordingly a need in the art for a harness for controlling the movement of an animal which, while providing the desired secure fit on the animal's head, does not apply undue or overly harsh pressure thereto.

SUMMARY OF THE INVENTION

In accordance with the foregoing need identified in the art, in one aspect the present invention provides a headpiece for use with a harness for controlling movement of an animal. The headpiece includes at least one strap for placing over an animal's poll, and further includes a spacer for reducing pressure caused by impinging of the strap on the poll of the animal on which the headpiece is placed. The spacer provides a separation between the strap and at least a portion of the poll of the animal on which the headpiece is placed, thereby reducing the risk of application of undue or harsh pressure thereto. It will be appreciated that the strap may be adapted for inclusion as a portion of a number of known harnesses for controlling an animal's movement by its head, including without limitation a bridle, a halter, a hackamore, and the like.

In another aspect, the present invention provides a harness for controlling movement of an animal. The harness of the invention includes at least one strap defining a headpiece for placing over the animal's poll as described above. In particular, the headpiece strap is provided with a spacer for reducing pressure caused by impinging of the strap on the animal's poll. In one embodiment, the spacer is provided with at least one cushioning segment, which defines a gap for providing a separation between the strap and at least a portion of the poll of the animal on which the harness is placed.

Still further, another aspect of the present invention is a method of making a harness for controlling movement of an animal. The method of the invention includes providing on the harness at least one strap defining a headpiece for placing over the animal's poll. As described above, the strap includes a spacer for reducing pressure caused by impinging of the strap on the animal's poll. The spacer is configured to provide a separation between the strap and at least a portion of the poll of the animal on which the harness is placed. In one embodiment, the spacer includes at least one cushioning segment defining a gap for providing the separation.

The embodiments shown and described herein are an illustration of one of the modes best suited to carry out the invention. It will be realized that the invention is capable of other different embodiments and its several details are capable of modification in various, obvious aspects all without departing from the invention. Accordingly, the drawings and descriptions will be regarded as illustrative in nature, and not as restrictive.

BRIEF DESCRIPTION OF THE DRAWING

The accompanying drawings incorporated in and forming a part of the specification, illustrates several aspects of the present invention, and together with the description serves to explain the principles of the invention. In the drawings.

Reference will now be made in detail to the best mode contemplated for carrying out the invention, examples of which are illustrated in the accompanying drawings. The examples are presented in support of and to further illustrate the invention as described herein. However, the invention is not to be considered as limited thereto.

DETAILED DESCRIPTION OF THE INVENTION

Proper fitting of a harness 10, as set forth in the foregoing description, is critical to provide an optimal level of control of the animal while ensuring the animal's comfort. An ill-fitting harness 10 is prone to slippage and may even become dislodged, interfering with a handler's ability to control the animal. Accordingly, the components as described above are typically adapted to provide a suitably snug fit about the animal's head in accordance with the purpose of the harness 10 (for example, it is known in the art that a looser fit is acceptable for a harness 10 such as a halter, whereas a harness 10 such as a bridle or a hackamore requires a snugger fit). However, it is also necessary to provide a harness 10 which, while fitting properly, also ensures the comfort of the animal wearing it. An ill-fitting or improperly configured harness 10 is distracting to the animal, and further may cause chafing or rubbing. Alternatively, a harness 10 which must be tightened to an undue degree to reduce slippage may cause discomfort to the animal. If the discomfort becomes too great, the animal may resist the handler's commands because of the pain, reducing the effectiveness of the harness 10 in controlling the animal.

As described above, many of the components of a harness 10 are primarily intended to prevent slippage or dislodgement of the harness 10 from the animal's head. As an example, a conventional bridle provides control of a horse's movement primarily by use of the bit and the reins. It is therefore important to provide additional components of the harness 10 which, while providing the desired snug fit on the animal's head, do not create unnecessary discomfort for the animal.

Figure 1:
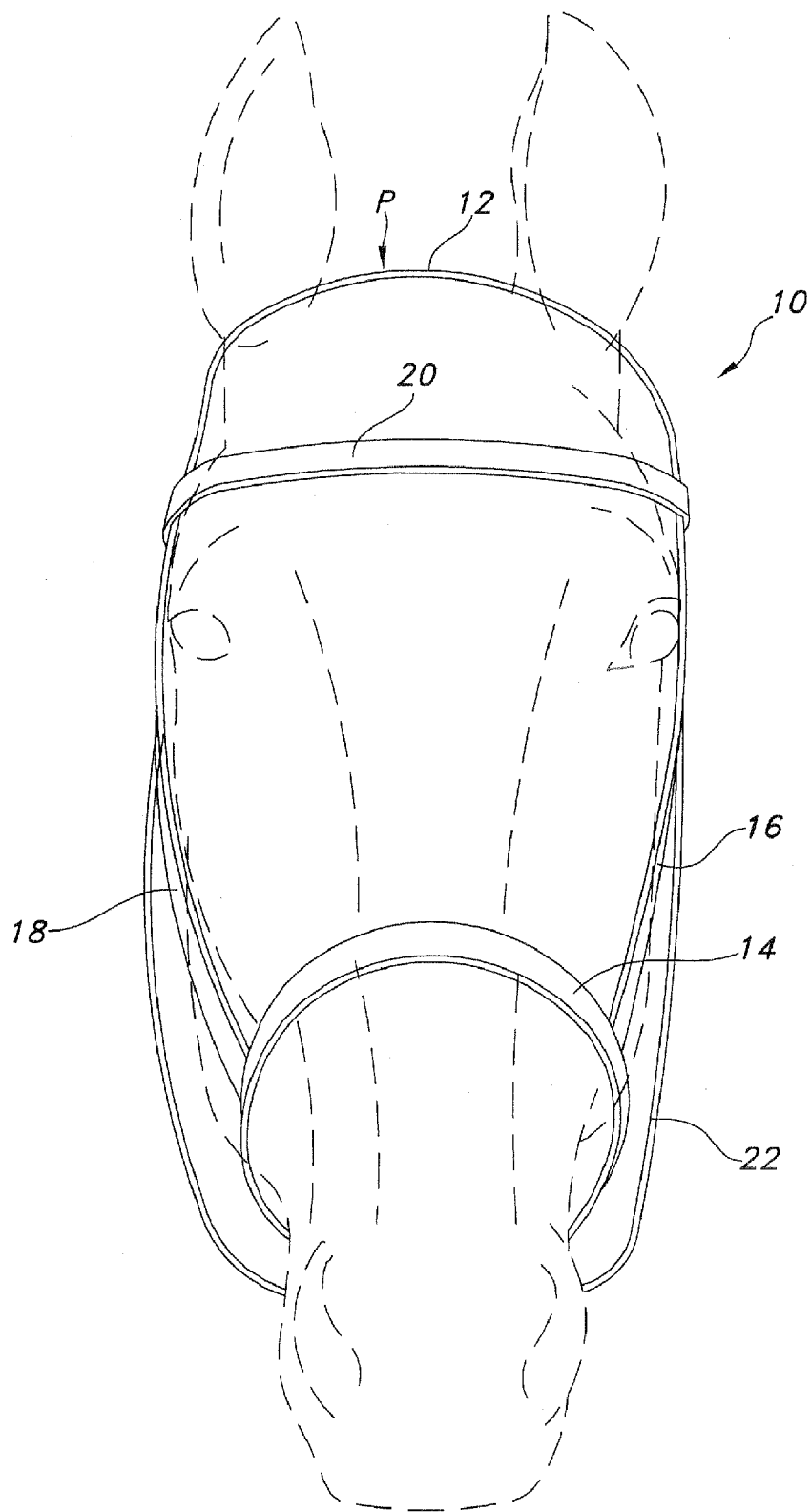
FIG. 1 is a front view of a prior art harness for controlling an animal's movement.

In particular, the animal's poll P (the fleshy area at the top of the head and behind the ears), is a sensitive area. The poll P therefore provides an area where pressure may be applied, but since it is not the primary area used to control the animal's movement, undue pressure is undesirable. A conventional harness 10 such as is depicted in FIG. 1 includes a headpiece 12 which rests directly on the poll P of the animal, and which may impinge on the poll P to a greater degree than is necessary to provide the desired control of the animal's movement. A harness 10 which does not provide such undue contact between the headpiece 12 and the poll P is therefore desirable.

Figure 2:
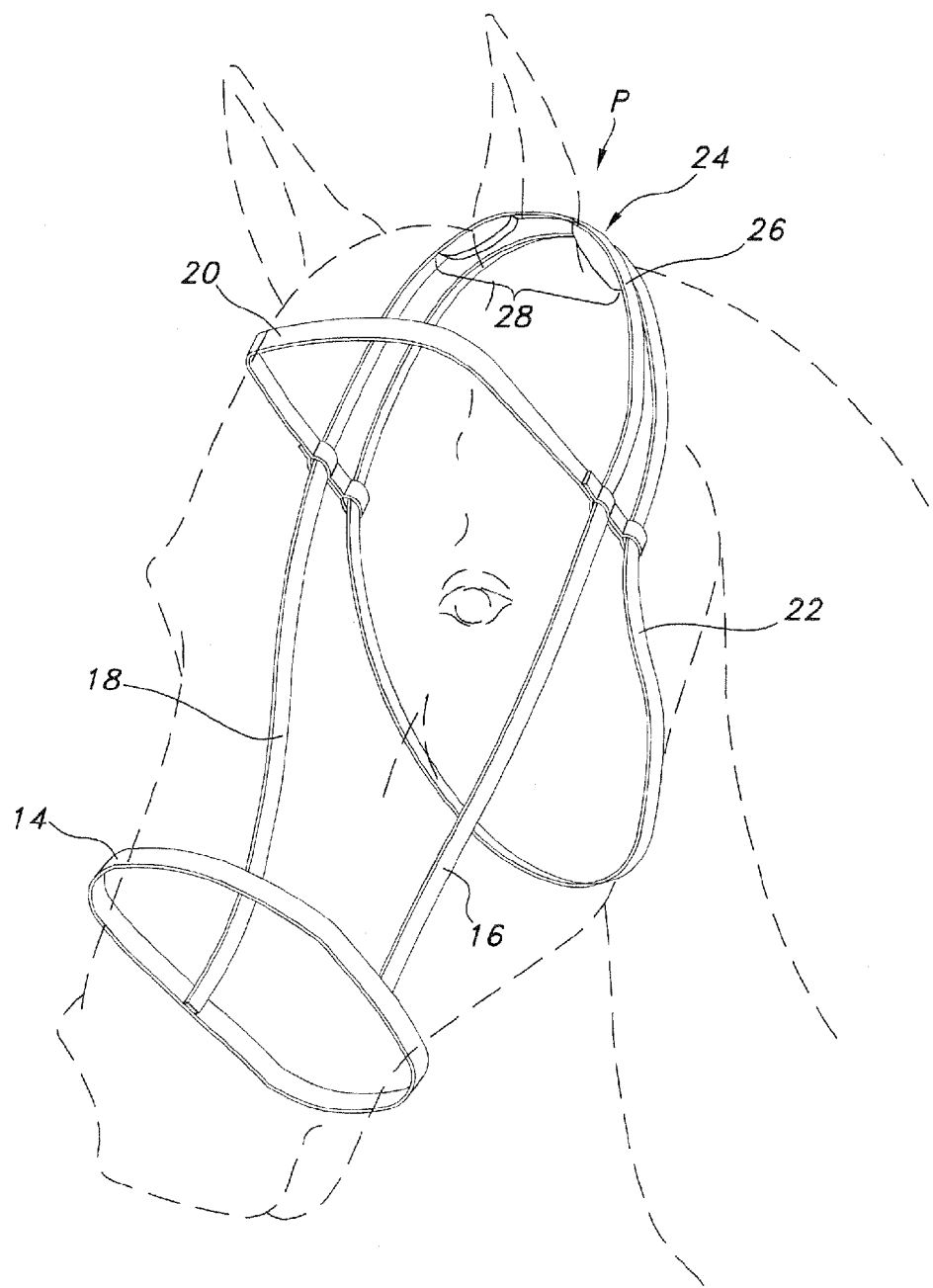
FIG. 2 is a perspective view of a harness according to the present invention.
Figure 3:
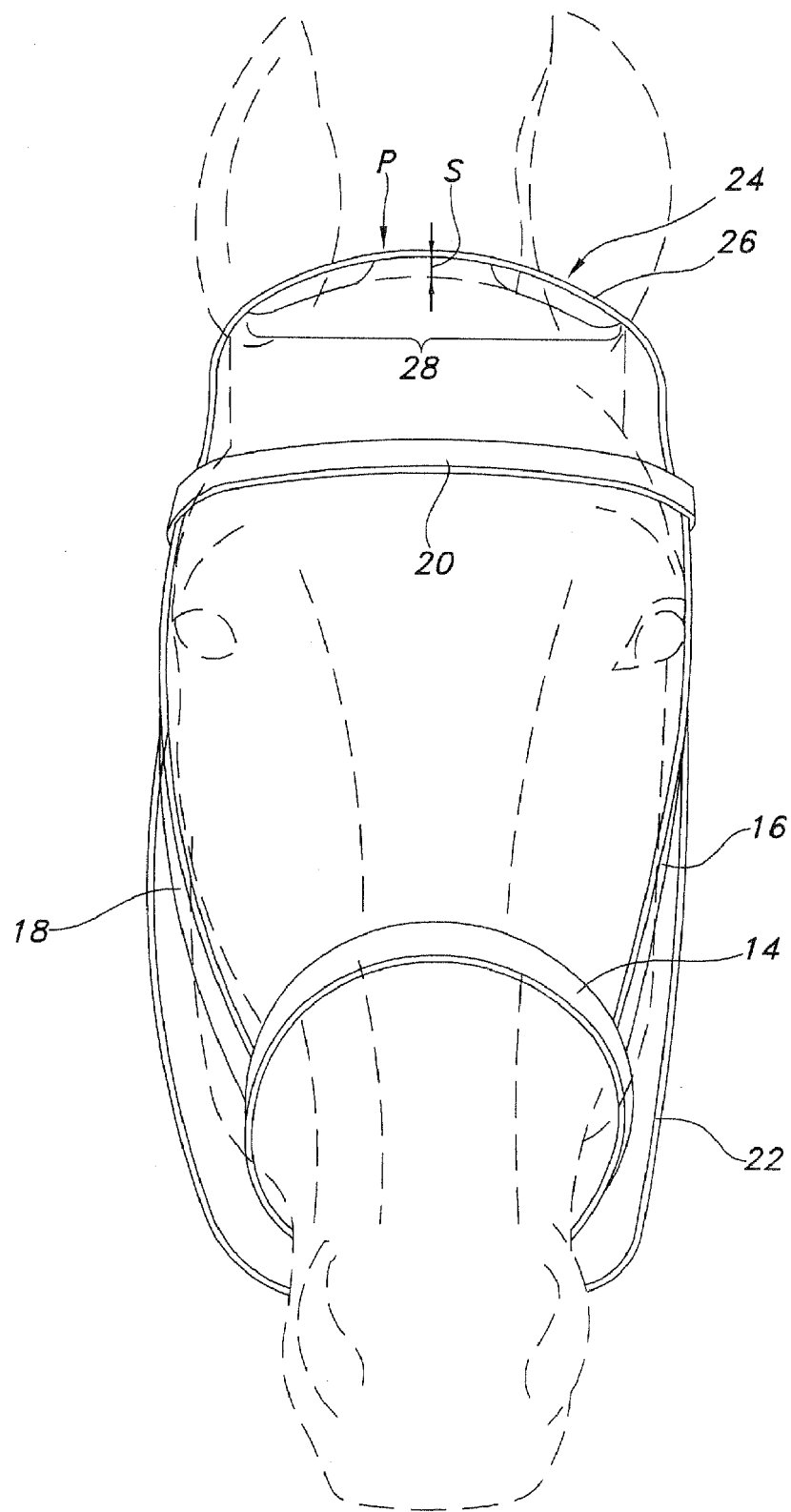
FIG. 3 is a front view of a harness according to the present invention.
Figure 4A:
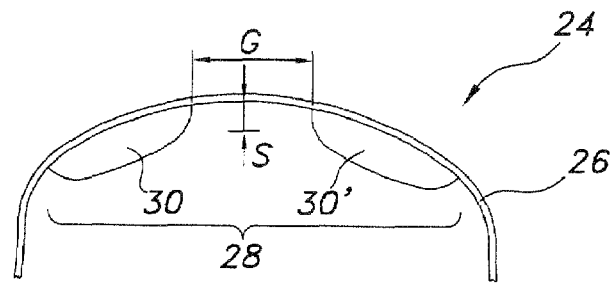
FIG. 4 shows several embodiments of a headpiece for a harness according to the present invention.
Figure 4B:
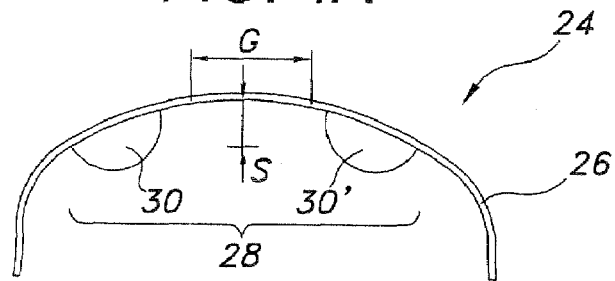
Figure 4C:
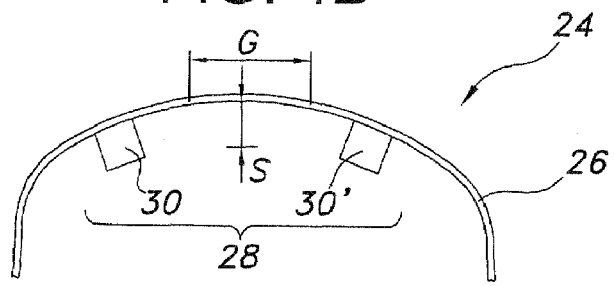
Figure 4D:
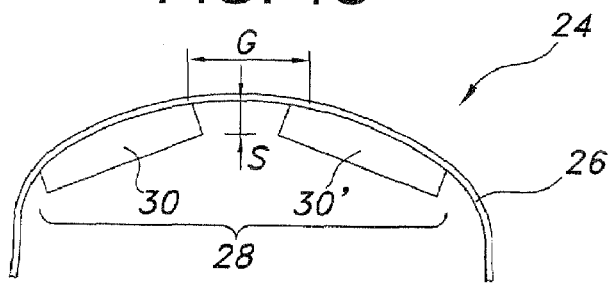
Figure 4E:
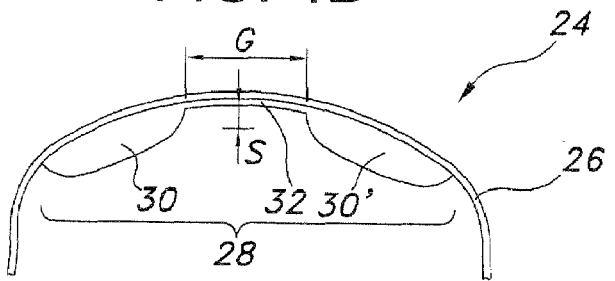

In accordance with the need identified in the foregoing description, a headpiece 24 for a harness 10 for controlling movement of an animal is provided (see FIG. 2). The headpiece 24, embodiments of which are shown in isolation in FIG. 4, includes at least one strap 26 which in use passes over and at least partially rests on the animal's poll P. The headpiece 24 further includes a spacer 28 for reducing pressure caused by impinging of the strap 26 on the poll P of the animal on which the headpiece 24 is placed. As best shown in FIGS. 3 and 4, the spacer 28 provides a separation S between the strap 26 and at least a portion of the poll P of the animal on which the headpiece 24 is placed.

With reference to FIG. 4, the spacer 28 typically includes at least one cushioning segment 30 on or connected to the strap 26, defining an empty gap G for providing the separation S. It will be appreciated that the at least one cushioning segment 30 may be provided in any desired shape, including but not limited to those shown in FIG. 4, to provide a separation S of varying degrees and also to define a gap G providing an empty space of varying widths. This allows the headpiece 24 to be configured to provide a harness 10 adapted for any particular sized or shaped head of the animal on which the harness 10 is placed.

In this regard, spacers 28 comprising without limitation oval (FIG. 4A), semicircular (FIG. 4B), square (FIG. 4C), and rectangular (FIG. 4D) cushioning segments 30, 30' are contemplated by the present invention. Still further (FIG. 4E), the present invention contemplates a spacer 28 comprising cushioning segments 30, 30' having a first thickness, with an intervening section 32 having a second thickness that is less than the first thickness. In any of these embodiments, preferred gaps G exist on the order of about 2-3 inches, to develop a separation S of about ½-1 inches. Of course, the skilled artisan will realize that the ultimate dimensions of gap G and separation S may be dictated by the size of the animal's head, as it is known to provide harnesses 10 of incrementally increasing sizes, or which may be adjusted incrementally in size upwardly or downwardly, to adapt to the size of the animal's head.

The size of the cushioning segments 30, 30' of spacer 28 are contemplated in a volume of about 2.5-3.5 inches cubed, although again it will be realized that to provide the desired gap G, this dimension may be dictated by the size of the head of the animal on which the harness 10 will be placed. Cushioning segments 30, 30' may include a taper at one or both ends (see FIG. 4A). It is contemplated that a spacer 28 may be provided having a thickness corresponding to the width of the strap 26 on which the spacer 28 is placed or connected to (see FIG. 2), although alternative widths for spacer 28 are contemplated also.

In one embodiment of the present invention, the spacer 28 is provided with first and second cushioning segments 30, 30' spaced apart on the strap 26 to define the gap G, whereby the first and second cushioning segments 30, 30' rest on opposed sides of the poll P of an animal on which the headpiece 24 is placed (see FIGS. 2 and 3). The skilled artisan will readily appreciate that the headpiece 24 of the present invention can be readily adapted to serve as a component of a number of known harnesses 10 for controlling movement of an animal, such as a bridle, a halter, a hackamore, and the like.

In another aspect, the present invention provides a harness 10 for controlling movement of an animal. In the depicted embodiment, the harness 10 is a bridle, although as noted above the harness 10 could also easily be configured as a halter, a hackamore, and the like. As described above, the harness 10 may include various components well known in the art, including a noseband 14, paired cheekpieces 16, 18 which rest on either side of the animal's face and which provide a connection between the noseband 14 and the headpiece 24, a browband 20, and a throatlatch 22. The harness 10 typically includes at least one strap 26 substantially as described above, which defines a headpiece 24 for placing over the animal's poll P, and further includes a spacer 28 for reducing pressure caused by impinging of the strap 26 on the animal's poll P. The spacer 28 typically comprises at least one cushioning segment 30 defining a gap G for providing a separation S between the strap 26 and at least a portion of the poll P of the animal on which the harness is placed.

In one embodiment of the harness 10, the spacer 28 includes first and second cushioning segments 30, 30' spaced apart on the strap 26 to define the gap G, whereby the first and second cushioning segments 30, 30' rest on opposed sides of the poll P of an animal on which the harness is placed. As described above, this allows tailoring the harness 10 suitably to adapt to any particular size and shape of animal head on which the harness 10 is to be placed. The configuration of spacer 28 may be as described in the foregoing description, including without limitation the examples depicted in FIG. 4. Spacer 28 may be dimensioned to provide gap G and separation S as described above, i.e., on the order of about 2-3 inches, to develop a separation S of about ½-1 inches. Of course, ultimately the dimensions of gap G and separation S may be dictated by the size of the animal's head, as it is known to provide harnesses 10 of incrementally increasing sizes, or which may be adjusted incrementally in size upwardly or downwardly, to adapt to the size of the animal's head. Of course, as is known in the art the other components of the harness 10 may be made adjustable, such as by buckles, snaps, hook-and-loop fittings and the like, to further provide the user with means to size the harness 10 appropriately to the animal on which it is placed.

In use, the harness 10 is placed on the animal's head, substantially as depicted in FIGS. 2 and 3, and adjusted to the desired degree of snugness. It will be appreciated that upon application of force to the strap 26 during use, such as during equitation or a driving sport such as harness racing, the cushioning segments 30, 30' of spacer 28 impinge upon the animal's head at positions corresponding to the placement of cushioning segments 30, 30' on strap 26. Unlike a conventional harness 10 as is depicted in FIG. 1, such impingement is not imposed on the entirety of the animal's poll P. In other words, as shown in FIGS. 2 and 3, the entirety of strap 26 does not impinge on the animal's poll P. In this manner, while force is applied to the animal's poll P to effect the desired measure of control over the animal's movement, overly harsh application of pressure, or excessive pressure is avoided.

Still further, in another aspect the present invention provides a method of making a harness 10 for controlling the movement of an animal, which harness may be configured as a bridle, a halter, a hackamore, and the like. Typically, various well-known components of such a harness 10 are provided, including a noseband 14, a browband 20, cheekpieces 16, 18, and optionally a throatlatch 22. Further elements may be included in accordance with the nature of the harness 10 being made. For example, in the case of a bridle, known components such as a bit (not shown), reins (not shown), a martingale (not shown), and other components useful in equitation may be provided. Still further, as described above various elements of the harness 10 may be made adjustable to conform to the animal's head by a variety of known means, such as buckles, hook-and-loop fittings, and the like.

The method of the present invention includes providing on the harness 10 at least one strap 26 as described above, the strap 26 defining a headpiece 24 for the harness 10, wherein the strap 26 includes a spacer 28 for reducing pressure caused by impinging of the strap 26 on the animal's poll P. As shown in the accompanying FIGS. 2-3, the spacer 28 provides a separation S between the strap 26 and at least a portion of the poll P of the animal on which the harness 10 is placed. As described above, the spacer 28 typically includes at least one cushioning segment 30 defining a gap G for providing the separation S. In one embodiment, a spacer 28 is provided including first and second cushioning segments 30, 30' spaced apart on the strap 26 to define the gap G, whereby the first and second cushioning segments 30, 30' rest on opposed sides of the poll P of an animal on which the harness 10 is placed. The dimensions of spacer 28, and the resulting dimensions of gap G and separation S, are as set forth in the foregoing description.

The spacer 28 is contemplated as being formed of an open or closed cell foam. Alternatively, other materials may be used, such as without limitation cotton or other natural or synthetic fiber wadding, a silica or other suitable gel material, various thicknesses of leather, and the like. The spacer 28 may be optionally covered by a material such as leather or any suitable synthetic material. For example, the spacer 28 may be covered with the same leather or synthetic material of which the strap 26 is formed. Typically, the leather or synthetic material will be configured to form a pocket or pouch in which the foam or other material is placed, followed by stitching or otherwise attaching to the material of strap 26, for example in a well known leather-stitching mariner.

The foregoing description has been presented for purposes of illustration and description. It is not intended to be exhaustive or to limit the invention to the precise form disclosed. Obvious modifications or variations are possible in light of the above teachings. For example, the foregoing description provides examples of the present invention primarily in the form of a bridle for use in equitation, driving, or other equine events wherein it is necessary for a handler (the rider, the driver, etc.) to control the movement of the horse in part by controlling the horse's head. However, the skilled artisan will readily understand that the present invention can easily be adapted for different types of harnesses, including without limitation halters, hackamores, muzzles to prevent biting or to restrict food intake, and the like. Still further, the skilled artisan will readily appreciate that the present invention finds use on any animal on which such harnesses are used. The foregoing description focused primarily on the horse, but it will be appreciated that the present invention may also be used on other animals, including without limitation other livestock, beasts of burden or companion animals, such as mules, cattle, dogs, and the like.

The described embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the foregoing description and appended claims, when interpreted in accordance with the breadth to which they are fairly, legally and equitably entitled.

What is claimed is:

1. A headpiece for a harness for controlling movement of an animal, comprising:
  at least one strap for placing over an animal's poll; and
  a spacer on or connected to the strap for reducing pressure caused by impinging of the strap on the poll of the animal on which the headpiece is placed;
  wherein the spacer comprises at least one cushioning segment on the strap, said at least one cushioning segment comprising a cushioning material and defining an empty gap dimensioned to receive the poll therein and to provide a separation between the strap and at least a portion of the poll of the animal
  further wherein said at least one cushioning segment defines at least one pouch attached to the strap, said at least one pouch containing a cushioning material in an interior thereof.

2. The headpiece of claim 1, wherein the spacer includes first and second cushioning segments spaced apart on the strap to define the gap, whereby the first and second cushioning segments rest on opposed sides of the poll of an animal on which the headpiece is placed.

3. The headpiece of claim 2, wherein the strap is adapted as a component of one of a bridle, a halter, or a hackamore.

4. The headpiece of claim 1, wherein the spacer is dimensioned to provide a gap of from about 2 to about 3 inches.

5. The headpiece of claim 1, wherein the spacer is dimensioned to provide a separation of from about ½ to about 1 inches between the strap, at least a portion of the spacer, and at least a portion of the poll of the animal.

6. The headpiece of claim 1, wherein the cushioning material is selected from at least one of an open cell foam, a closed cell foam, cotton, a natural fiber wadding, a synthetic fiber wadding, a gel material, or a silica gel material.

7. The headpiece of claim 1, wherein the empty gap spans substantially an entirety of a transverse width of the strap.

8. A harness for controlling movement of an animal, comprising:
- at least one strap defining a headpiece for placing over the animal's poll; and
- a spacer on or connected to the strap for reducing pressure caused by impinging of the strap on the poll of the animal on which the headpiece is placed;
- wherein the spacer includes first and second separate cushioning segments spaced apart on the strap to define an empty gap spanning substantially an entirety of a transverse width of the strap and dimensioned to receive the poll therein. whereby the first and second cushioning segments rest on opposed sides of the poll of an animal on which the harness is placed ,the first and second cushioning segments each defining pouches attached to the strap, said pouches containing cushioning material in an interior thereof;
- further wherein the empty gap eliminates contact between at least a portion of the strap and at least a portion of the poll over which it is placed.

9. The harness of claim 8, wherein the harness is one of a bridle, a halter, or a hackamore.

10. The harness of claim 8, wherein the spacer is dimensioned to provide a gap of from about 2 to about 3 inches.

11. The harness of claim 8, wherein the spacer is dimensioned to provide a separation of from about ½ to about 1 inches between the strap, at least a portion of the spacer, and at least a portion of the poll of the animal.

12. The harness of claim 8, wherein the cushioning material is selected from at least one of an open cell foam, a closed cell foam, cotton, a natural fiber wadding, a synthetic fiber wadding, a gel material, or a silica gel material.

13. A method of making a harness for controlling movement of an animal, comprising providing on the harness at least one strap defining a headpiece for placing over the animal's poll;
- further including providing on said strap a spacer for reducing pressure caused by impinging of the strap on the animal's poll, said spacer providing a separation between the strap and at least a portion of the poll of the animal on which the harness is placed;
- wherein the spacer is formed by providing at least one cushioning segment consisting of a pouch filled with a cushioning material;
- said spacer defining an empty gap spanning substantially an entirety of a transverse width of the strap and dimensioned to receive the poll therein and to provide the separation and eliminate contact between at least a portion of the strap and at least a portion of the poll.

14. The method of claim 13, including providing a spacer including first and second cushioning segments spaced apart on the strap to define the gap, whereby the first and second cushioning segments rest on opposed sides of the poll of an animal on which the harness is placed.

15. The method of claim 13, including providing the strap as a portion of one of a bridle, a halter, or a hackamore.

16. The method of claim 13, including the step of dimensioning the spacer to provide a gap of from about 2 to about 3 inches.

17. The method of claim 13, including the step of dimensioning the spacer to provide a separation of from about ½ to about 1 inches between the strap, at least a portion of the spacer, and at least a portion of the poll of the animal.

18. The method of claim 13, including the step of selecting the cushioning material from at least one of an open cell foam, a closed cell foam, cotton, a natural fiber wadding, a synthetic fiber wadding, a gel material, or a silica gel material.

* * * * *